US009856015B2

(12) United States Patent
Saint-Marc et al.

(10) Patent No.: US 9,856,015 B2
(45) Date of Patent: Jan. 2, 2018

(54) RUDDER BAR FOR AN AIRCRAFT

(71) Applicant: Airbus Operations (SAS), Toulouse (FR)

(72) Inventors: Laurent Saint-Marc, Montaigut sur Save (FR); Christophe Mialhe, Giroussens (FR); Patrick Lieven, Fronton (FR); Romain Delahaye, Colomiers (FR); Marc Audibert, Brax (FR); Nicolas Chatrenet, Colomiers (FR)

(73) Assignee: Airbus Operations (SAS), Toulouse (FR)

( * ) Notice: Subject to any disclaimer, the term of this patent is extended or adjusted under 35 U.S.C. 154(b) by 36 days.

(21) Appl. No.: 14/961,349

(22) Filed: Dec. 7, 2015

(65) Prior Publication Data

US 2016/0159457 A1 Jun. 9, 2016

(30) Foreign Application Priority Data

Dec. 8, 2014 (FR) ..................................... 14 62043

(51) Int. Cl.
*B64C 19/02* (2006.01)
*B64C 13/04* (2006.01)
*B64C 13/06* (2006.01)
*G05G 1/30* (2008.04)

(52) U.S. Cl.
CPC .............. *B64C 13/04* (2013.01); *B64C 13/06* (2013.01); *G05G 1/30* (2013.01)

(58) Field of Classification Search
CPC ....... B64C 13/04; B64C 13/503; B64C 13/06; B64C 13/22; B64C 27/56; G05G 1/30; G05G 1/44; G05G 1/506; G05G 1/34
See application file for complete search history.

(56) References Cited

U.S. PATENT DOCUMENTS

| 2,420,528 A * | 5/1947 | Eaton, Jr. ................ B64C 13/04 244/235 |
| 2,424,523 A * | 7/1947 | Watter .................... B64C 25/44 244/235 |
| 2,585,688 A * | 2/1952 | Saulnier .................. B64C 13/04 244/235 |
| 3,426,624 A * | 2/1969 | Erhardt ................. B60W 30/18 192/221 |

(Continued)

FOREIGN PATENT DOCUMENTS

GB 660825 11/1951

OTHER PUBLICATIONS

French Search Report, dated Jul. 27, 2015.

*Primary Examiner* — Assres H Woldemaryam

(57) ABSTRACT

A rudder bar for an aircraft comprising a floor, a steering connecting rod and a braking connecting rod. The rudder bar comprises a base fixed above the floor, a pedal arm mounted rotatably on the base about a first axis of rotation and having a lower end and an upper end, a pedal mounted rotatably on the lower end about a second axis of rotation, a first transmission assembly configured to transmit a movement to the steering connecting rod when the pedal arm pivots about the first axis of rotation, and a second transmission assembly configured to transmit a movement to the braking connecting rod when the pedal pivots about the second axis of rotation.

10 Claims, 3 Drawing Sheets

(56) References Cited

U.S. PATENT DOCUMENTS

| | | | | |
|---|---|---|---|---|
| 5,056,742 A | * | 10/1991 | Sakurai | B64C 13/06 244/235 |
| 8,353,484 B2 | * | 1/2013 | Gardner | B64C 13/04 244/235 |
| 2007/0205333 A1 | * | 9/2007 | Boczar | B64C 13/04 244/235 |
| 2008/0023591 A1 | * | 1/2008 | Christensen | B64C 13/04 244/235 |
| 2014/0131523 A1 | | 5/2014 | Carner et al. | |
| 2015/0151635 A1 | * | 6/2015 | Kurokawa | B60K 23/02 180/332 |

* cited by examiner

RUDDER BAR FOR AN AIRCRAFT

CROSS-REFERENCES TO RELATED APPLICATIONS

This application claims the benefit of the French patent application No. 1462043 filed on Dec. 8, 2014, the entire disclosures of which are incorporated herein by way of reference.

BACKGROUND OF THE INVENTION

The present invention relates to a rudder bar for an aircraft and to an aircraft comprising such a rudder bar.

In an aircraft, a rudder bar is a mechanical device allowing the pilot to control the rudder and the wheel brakes.

The rudder bar has a pedal and a set of movable parts, which, depending on the types of movements that are applied to the pedal, control the rudder or the brakes.

The fixing of the rudder bar and the transmission of controls from the rudder bar to the rudder and/or the brakes are implemented below the floor of the cockpit. Such a setup is due to the fact that such a rudder bar originally would transmit its controls via mechanical systems such as cables.

Nowadays, the controls of the rudder bar are transmitted by electrical systems. In spite of this development, the structure of the rudder bars has not developed and the setup of a rudder bar of the prior art remains complex.

In addition, due to this complexity of installation and fixation below the floor, the bulk of the rudder bar of the prior art limits its capacity for adaptation to the morphology of the pilot. In other words, the range of adjustment of the rudder bar is limited due to its associated bulk and prevents it from adapting to all morphologies of pilots.

SUMMARY OF THE INVENTION

An object of the present invention is to provide a rudder bar that does not have the disadvantages of the prior art and that, in particular, allows a simple setup.

To this end, a rudder bar is provided for an aircraft comprising a floor, a steering connecting rod and a braking connecting rod, the rudder bar comprising:

a base fixed above the floor, a pedal arm mounted rotatably on the base about a first axis of rotation and having a lower end and an upper end, which extend from either side of the first axis of rotation, the lower end being oriented toward the floor relative to the first axis of rotation, a pedal mounted rotatably on the lower end about a second axis of rotation, which is parallel to and distanced from the first axis of rotation, a first transmission assembly configured to transmit a movement to the steering connecting rod when the pedal arm pivots about the first axis of rotation, and a second transmission assembly configured to transmit a movement to the braking connecting rod when the pedal pivots about the second axis of rotation.

The rudder bar is therefore fixed entirely above the floor of the cockpit, which facilitates the installation of the rudder bar.

In accordance with a particular embodiment, the base is formed of a base element fixed to the aircraft structure above the floor and of a paddle mounted rotatably on the base element about an adjustment axis parallel to and distanced from the first axis of rotation, the pedal arm is mounted rotatably on the paddle about the first axis of rotation, and the rudder bar has blocking means configured to assume, in turn, a blocking position, in which they block the rotation of the paddle, or an adjustment position, in which they allow the paddle to rotate freely.

The blocking means advantageously comprise:

a rack and pinion extending over an arc of a circle centered on the adjustment axis and formed on the paddle, and a ratchet system comprising a tooth and movement means configured to move the tooth from a ratcheted position in which the tooth cooperates with the rack and pinion into a free position in which the tooth does not cooperate with the rack and pinion.

The movement means advantageously comprise:

a pedestal fixed relative to the base element, a lever, which carries the tooth and which is rotatable on the pedestal in order to assume, in turn, the ratcheted position or the free position, and a return element, which forces the lever into the ratcheted position.

The rudder bar advantageously comprises a push means creating a force that pushes the paddle toward the pilot.

The first transmission assembly advantageously comprises:

a steering shaft mounted rotatably about a steering axis and fixed to the steering connecting rod, and a first link, of which a first end is mounted in an articulated manner on the upper end, and of which a second end is mounted in an articulated manner on the steering shaft such that the rotation of the pedal arm about the first axis of rotation in one direction drives the rotation of the steering shaft in a first direction, and such that the rotation of the pedal arm about the first axis of rotation in the opposite direction drives the rotation of the steering shaft in a second direction, which is opposite the first direction.

The articulation of the first end of the first link on the upper end is advantageously a rotation about the adjustment axis.

The second assembly advantageously comprises:

a beam mounted rotatably on the base or the base element about a third axis of rotation, one of the arms of the beam being fixed to the braking connecting rod, and a second link, of which a first end is mounted in an articulated manner on a first arm of the beam, and of which a second end is mounted in an articulated manner on the pedal.

In accordance with a particular embodiment of the invention, the third axis of rotation coincides with the adjustment axis.

The rudder bar advantageously comprises a return system configured to exert a return force on the beam in order to force the pedal into a neutral position.

The invention also provides an aircraft comprising a cockpit with a floor, a rudder, brakes, a steering connecting rod configured to transmit a control to the rudder, a braking connecting rod configured to transmit a control to the brakes, and a rudder according to one of the preceding variants, arranged in the cockpit above the floor.

BRIEF DESCRIPTION OF THE DRAWINGS

The features of the invention mentioned above as well as further features will become clearer upon reading the following description of an exemplary embodiment, the description being provided with reference to the accompanying drawings, in which.

DETAILED DESCRIPTION OF THE
PREFERRED EMBODIMENTS

Figure 1:
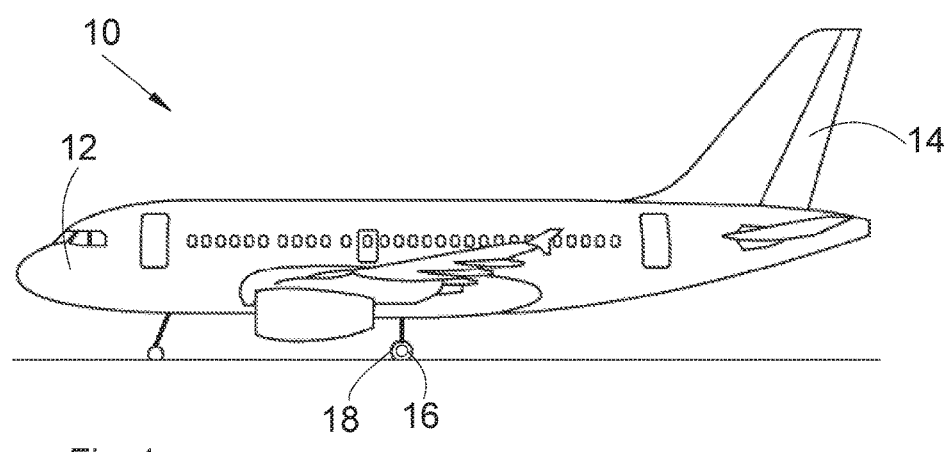
FIG. 1 shows an aircraft according to the invention.

FIG. 1 shows an aircraft 10, which has a cockpit 12, in which at least one rudder bar according to the invention is arranged. The aircraft 10 also comprises a rudder 14 and brakes 14 at the wheels 18.

Figure 2:
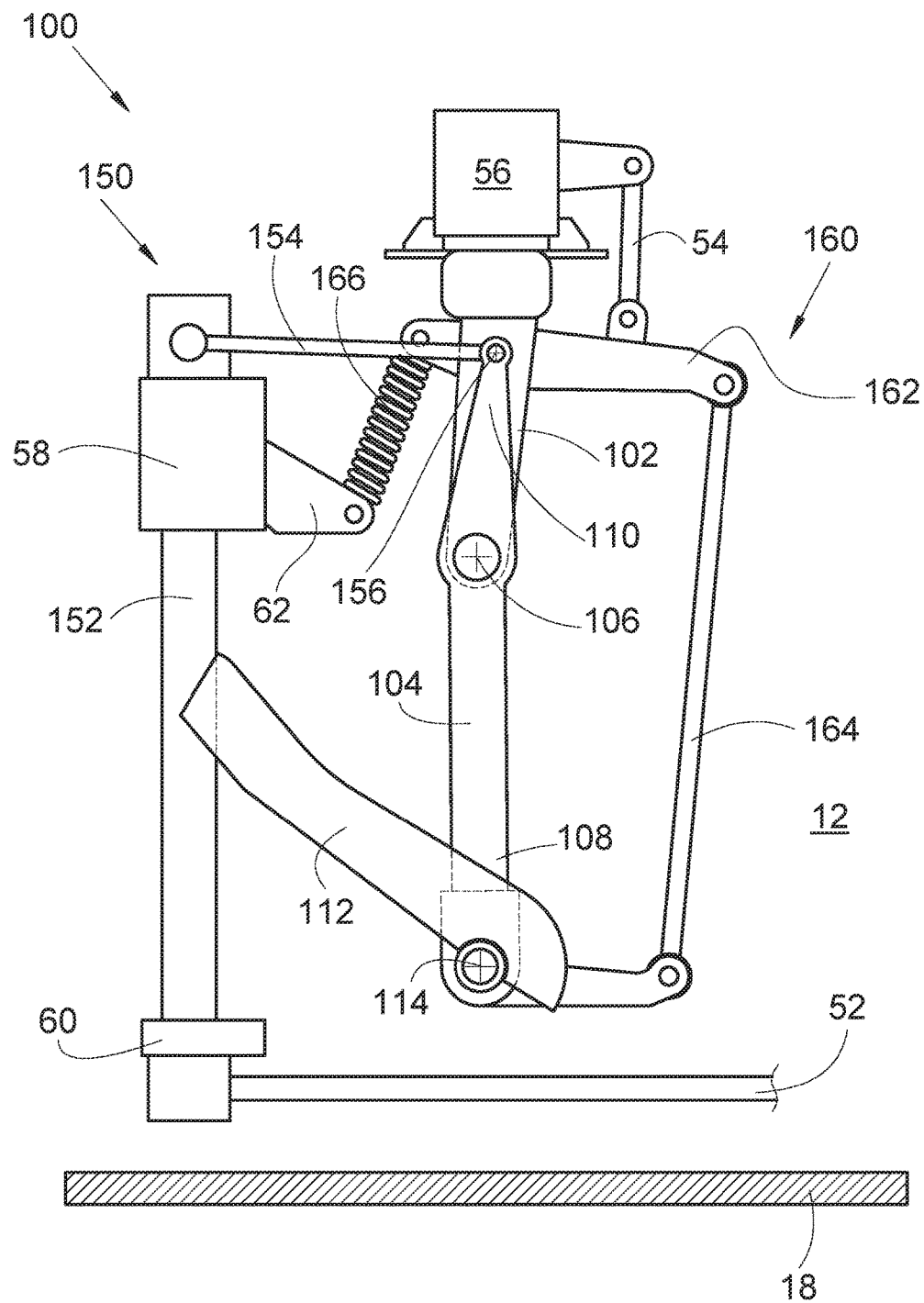
FIG. 2 shows a rudder bar in accordance with a first embodiment of the invention.
Figure 3:
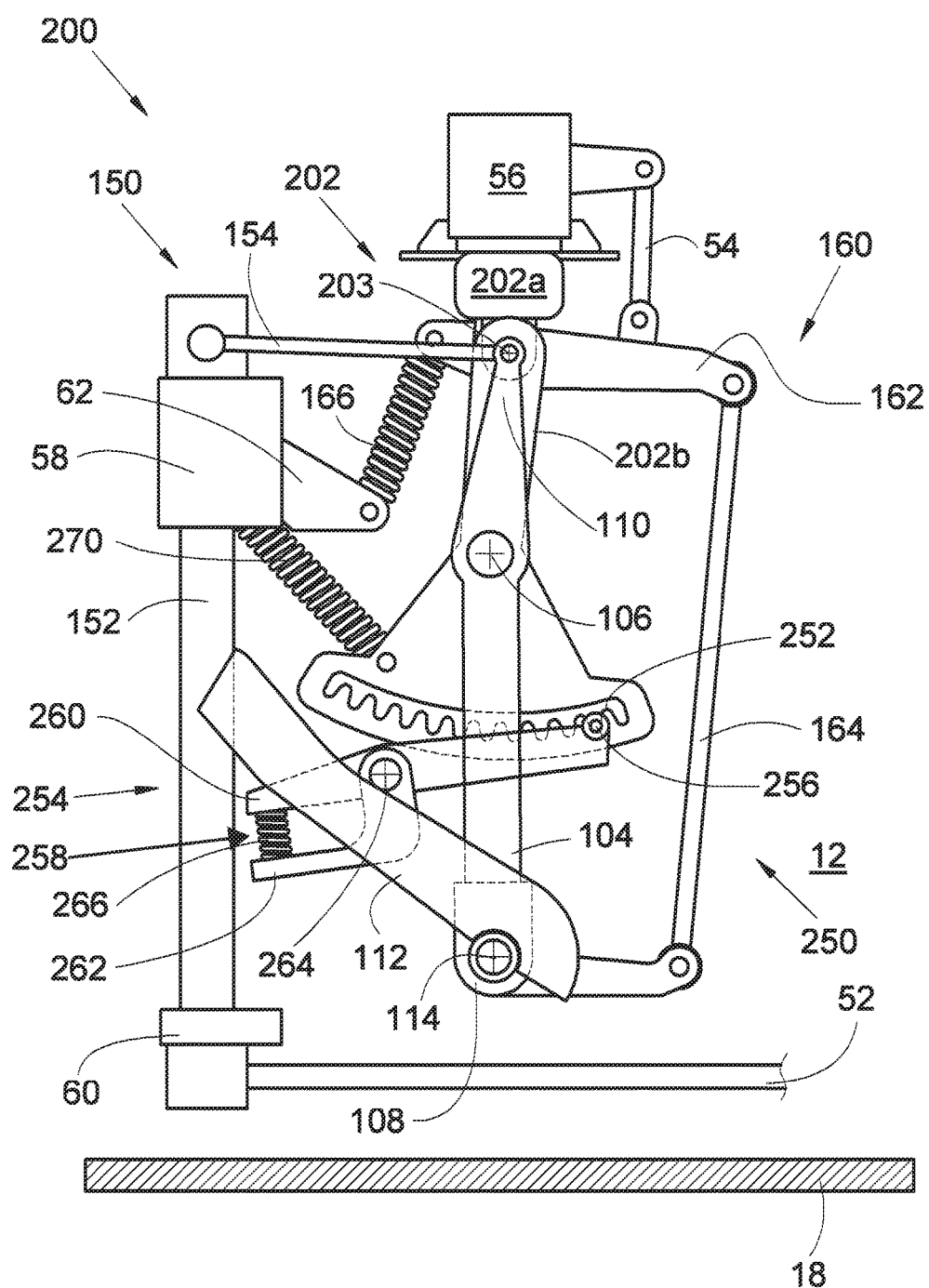
FIG. 3 shows a rudder bar in accordance with a second embodiment of the invention.

FIG. 2 shows a rudder bar 100 in accordance with a first embodiment of the invention, and FIG. 3 shows a rudder bar 200 in accordance with a second embodiment of the invention. The elements common to both rudder bars 100 and 200 bear the same references.

The rudder bar 100, 200 is arranged and fixed above the floor 18 of the cockpit 12.

The rudder bar 100, 200 is connected to a steering connecting rod 52, which is additionally connected to a steering control unit. When the steering connecting rod 52 is maneuvered, it transmits a mechanical control to the steering control unit, which transforms this mechanical control into an electrical signal and transmits this electrical signal to a maneuvering system configured to maneuver the rudder 14.

The rudder bar 100, 200 is also connected to a braking connecting rod 54, which is additionally connected to a braking control unit 56. When the braking connecting rod 54 is maneuvered, it transmits a mechanical control to the braking control unit 56, which transforms this mechanical control into an electrical signal and transmits this electrical signal to an activation system configured to activate the brakes 16.

The rudder bar 100, 200 comprises:

a base 102, 202, which is fixed to the structure of the aircraft 10 above the floor 18, a pedal arm 104, which is mounted rotatably on the base 102, 202 about a first axis of rotation 106 and has a lower end 108 and an upper end 110, which extend from either side of the first axis of rotation 106, the lower end 108 being oriented toward the floor 18 relative to the first axis of rotation 106, and a pedal 112, which is mounted rotatably on the lower end 108 about a second axis of rotation 114, which is parallel to and distanced from the first axis of rotation 106, a first transmission assembly 150 configured to transmit a movement to the steering connecting rod 52 when the pedal arm 104 pivots about the first axis of rotation 106, and a second transmission assembly 160 configured to transmit a movement to the braking connecting rod 54 when the pedal 112 pivots about the second axis of rotation 114.

Thus, the fixing of the set of elements forming the rudder bar 100, 200 above the floor 18 facilitates the installation thereof in the cockpit 12.

The first transmission assembly 150 comprises:

a steering shaft 152, which is mounted rotatably about a steering axis, which here is vertical, and which is fixed to the steering connecting rod 52, and a first link 154, of which a first end is mounted in an articulated manner on the upper end 110, and of which a second end is mounted in an articulated manner on the steering shaft 152 such that the rotation of the pedal arm 104 about the first axis of rotation 106 in one direction drives the rotation of the steering shaft 52 in a first direction, and such that the rotation of the pedal arm 104 about the first axis of rotation 106 in the opposite direction drives the rotation of the steering shaft 152 in a second direction, which is opposite the first direction.

The second end is fixed here on the periphery of the steering shaft 152.

The steering shaft 152 is fixed to the structure of the aircraft 10 by a first bearing 58 in the upper portion and by a second bearing 60 in the lower portion.

The second assembly 160 comprises:

a beam 162 mounted rotatably on the base 102 about a third axis of rotation 156, which is parallel to and distanced from the first axis of rotation 106, and of which one of the arms is fixed to the braking connecting rod 54, and a second link 164, of which a first end is mounted in an articulated manner on a first arm of the beam 162 and of which a second end is mounted in an articulated manner on the pedal 112.

When a foot of the pilot presses the pedal 112 from a neutral position, causing the pedal to pivot about the second axis of rotation 114, the movement of the pedal 112 drives the rotation of the beam 162 by the action of the second link 164, which drives the movement of the braking connecting rod 54 and activates the brakes 16. The neutral position is the position of the pedal 112 when the pilot is not pressing on the pedal 112.

In order to facilitate the return of the pedal 112 into the neutral position after having been depressed, the rudder bar 100, 200 comprises a return system 166 configured to exert a restoring force onto the beam 162 in order to force the pedal 112 into the neutral position thereof.

The return system 166 here takes the form of a spring-mounted link, which is fixed between the second arm of the beam 162 and the structure of the aircraft 10, here by way of an articulation support 62, which is here connected to the first bearing 58.

In the case of the embodiment of the invention shown in FIG. 3, the base 202 is formed of a base element 202a, which is fixed to the structure of the aircraft 10 above the floor 18, and of a paddle 202b, which is mounted rotatably on the base element 202a about an adjustment axis 203 parallel to and distanced from the first axis of rotation 106, and the pedal arm 104 is mounted rotatably on the paddle 202b about the first axis of rotation 106.

The rudder bar 200 has blocking means 250, which are configured to assume, in turn, a blocking position, in which they block the rotation of the paddle 202b, or an adjustment position, in which they allow the paddle 202b to rotate freely.

In the blocking position the paddle 202b is fixed relative to the base element 202a.

In the adjustment position the paddle 202b may pivot about the adjustment axis 203, thus driving the movement in rotation of the first axis of rotation 106. This movement of the first axis of rotation 106 drives the rotation of the pedal arm 104 about the adjustment axis 203 and therefore a movement of the pedal 112, which allows an adaptation to the morphology of the pilot.

In this embodiment the beam 162 of the second assembly 160 is mounted rotatably on the base element 202a.

In the embodiment of the invention shown in FIG. 3, the articulation of the first end of the first link 154 on the upper end 110 is a rotation about the adjustment axis 203 in order to maintain an unchanged position of the articulation when the pedal arm 104 tilts during the adjustment by rotation about the adjustment axis 203. Thus, the different adjustment positions of the paddle 202b do not result in any control in the direction of the steering connecting rod 52.

In the embodiment of the invention shown in FIG. 3, the third axis of rotation 156 coincides with the adjustment axis 203. Thus, the different adjustment positions of the paddle 202b do not result in a control in the direction of the braking connecting rod 54. In addition, the beam 162, the second link 164, the pedal 112 and the pedal arm 104 form a deformable parallelogram, which makes it possible to keep the pedal 112 in an angular position suitable for receiving the foot of the pilot.

In the embodiment of the invention shown in FIG. 3 the blocking means 250 comprise:

a rack and pinion 252 extending over an arc of a circle centered on the adjustment axis 203 and formed on the paddle 202b, and a ratchet system 254 comprising a tooth 256 and movement means 258 configured to move the tooth 256 from a ratcheted position, corresponding to the blocking position, in which the tooth 256 cooperates with the rack and pinion 252 in order to block the rotation of the paddle 202b, into a free position, corresponding to the adjustment position, in which the tooth 256 does not cooperate with the rack and pinion 252, and vice versa.

The movement means 258 here comprise:

a pedestal 262 fixed relative to the base element 202a and to the aircraft structure 10, a lever 260, which carries the tooth 256 and which is rotatable on the pedestal 262 about a ratcheting axis 264, which is here parallel to the adjustment axis 203, in order to assume, in turn, the ratcheted position or the free position, and a return element 266, which forces the lever 260 into the ratcheted position.

The return element 266 is here a compression spring.

The paddle 202b is then adjusted in the following manner:

the pilot tilts the lever 260 in order to move it into a free position, disengaging the tooth at 256 of the rack and pinion 252, the pilot then moves the paddle 202b about the adjustment axis 203 until the desired position has been reached, and the pilot then releases the lever 260, which, under the action of the return element 266, returns to a ratcheted position and unlocks the position of the paddle 202b.

In order to facilitate the positional adjustment of the paddle 202b, the paddle bar 200 has a push means 270, which creates a force that pushes the paddle 202b toward the pilot when in a seated position.

The push means 270 for example takes the form of a spring-mounted connecting rod, which is disposed between a fixed point of support, here the first bearing 58, and the paddle 202b.

Thus, when the pilot tilts the lever 260 in order to move it into the free position, the push means 270 automatically pushes the paddle 202b toward the pilot, and, in order to adjust the position of the paddle 202b and therefore of the pedal 112, the pilot merely has to push on the pedal 112 using his foot until the desired position is reached, then release the lever 260.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft rudder bar for an aircraft comprising a floor, a steering connecting rod and a braking connecting rod, said rudder bar comprising:

a base fixed above the floor, a pedal arm mounted rotatably on the base about a first axis of rotation and having a lower end oriented toward the floor relative to the first axis of rotation, a pedal mounted rotatably on the lower end about a second axis of rotation, which is parallel to and distanced from the first axis of rotation, a first transmission assembly configured to transmit a movement to the steering connecting rod when the pedal arm pivots about the first axis of rotation, and a second transmission assembly configured to transmit a movement to the braking connecting rod when the pedal pivots about the second axis of rotation, wherein the base is formed of a base element fixed above the floor and of a paddle mounted rotatably on the base element about an adjustment axis parallel to and distanced from the first axis of rotation, wherein the pedal arm is mounted rotatably on the paddle about the first axis of rotation, and wherein the rudder bar has blocking means configured to assume, in turn, a blocking position, in which said blocking means blocks the rotation of the paddle, or an adjustment position, in which said blocking means allows the paddle to rotate freely.

2. The aircraft rudder bar as claimed in claim 1, wherein the blocking means comprise:

a rack and pinion extending over an arc of a circle centered on the adjustment axis and formed on the paddle, and a ratchet system comprising a tooth and movement means configured to move the tooth from a ratcheted position, in which the tooth cooperates with the rack and pinion, into a free position, in which the tooth does not cooperate with the rack and pinion.

3. The aircraft rudder bar as claimed in claim 2, wherein the movement means comprise:

a pedestal fixed relative to the base element, a lever, which carries the tooth and which is rotatable on the pedestal in order to assume, in turn, the ratcheted position or the free position, and a return element, which forces the lever into the ratcheted position.

4. The aircraft rudder bar as claimed in claim 1 further comprising: a push means creating a force that pushes the paddle toward a pilot of the aircraft.

5. The aircraft rudder bar as claimed in claim 1, wherein the pedal arm has an upper end, and wherein the lower end and the upper end extend from either side of the first axis of rotation and wherein the first transmission assembly comprises:

a steering shaft mounted rotatably about a steering axis and fixed to the steering connecting rod, and a first link, of which a first end is mounted in an articulated manner on the upper end, and of which a second end is mounted in an articulated manner on the steering shaft, such that the rotation of the pedal arm about the first axis of rotation in one direction drives the rotation of the steering shaft in a first direction, and such that the rotation of the pedal arm about the first axis of rotation in the opposite direction drives the rotation of the steering shaft in a second direction, which is opposite said first direction.

6. The aircraft rudder bar as claimed in claim 5, wherein the articulation of the first end of the first link on the upper end is advantageously a rotation about the adjustment axis.

7. The aircraft rudder bar as claimed in claim 1, wherein the second assembly comprises:
   a beam mounted rotatably on the base or the base element about a third axis of rotation, said beam being fixed to the braking connecting rod, and
   a second link, of which a first end is mounted in an articulated manner on a first arm of the beam, and of which a second end is mounted in an articulated manner on the pedal.

8. The aircraft rudder bar as claimed in claim 7, wherein the third axis of rotation coincides with the adjustment axis.

9. The aircraft rudder bar as claimed in claim 7, further comprising a return system configured to exert a restoring force on the beam in order to force the pedal into a neutral position.

10. An aircraft comprising:
   a cockpit with a floor,
   a rudder,
   brakes,
   a steering connecting rod configured to transmit a control to the rudder,
   a braking connecting rod configured to transmit a control to the brakes, and
   a rudder bar comprising:
   a base fixed above the cockpit floor,
   a pedal arm mounted rotatably on the base about a first axis of rotation and having a lower end oriented toward the floor relative to the first axis of rotation,
   a pedal mounted rotatably on the lower end about a second axis of rotation, which is parallel to and distanced from the first axis of rotation,
   a first transmission assembly configured to transmit a movement to the steering connecting rod when the pedal arm pivots about the first axis of rotation, and
   a second transmission assembly configured to transmit a movement to the braking connecting rod when the pedal pivots about the second axis of rotation,
   wherein the base is formed of a base element fixed above the floor and of a paddle mounted rotatably on the base element about an adjustment axis parallel to and distanced from the first axis of rotation,
   wherein the pedal arm is mounted rotatably on the paddle about the first axis of rotation, and
   wherein the rudder bar has blocking means configured to assume, in turn, a blocking position, in which said blocking means blocks the rotation of the paddle, or an adjustment position, in which said blocking means allows the paddle to rotate freely.

* * * * *